US005669340A

United States Patent [19]

Ohori

[11] Patent Number: 5,669,340

[45] Date of Patent: Sep. 23, 1997

[54] TWO-CYCLE ENGINE EMPLOYING A FLYWHEEL

[76] Inventor: Hiroshi D. Ohori, 11 Saddle Rd., Cedar Knolls, N.J. 07927

[21] Appl. No.: 646,731

[22] Filed: May 1, 1996

Related U.S. Application Data

[63] Continuation of Ser. No. 331,044, Oct. 28, 1994.

[51] Int. Cl.[6] ........ F02C 5/00

[52] U.S. Cl. ........ 123/48 AA; 60/39.44

[58] Field of Search ........ 123/55.7, 65 R, 123/48 AA, 197.1, 55.2; 60/39.44, 39.38, 624

[56] References Cited

U.S. PATENT DOCUMENTS

| | | | |
|---|---|---|---|
| 1,116,730 | 11/1914 | Powell | 60/624 |
| 1,131,803 | 3/1915 | Stewart | 60/39.44 |
| 1,388,371 | 8/1921 | Pierce | 60/39.44 |
| 3,175,360 | 3/1965 | Glenn | 60/39.38 |
| 3,710,569 | 1/1973 | Rinker | 60/39.44 |
| 3,769,793 | 11/1973 | Wilson | 60/39.44 |

FOREIGN PATENT DOCUMENTS

| | | | |
|---|---|---|---|
| 2910304 | 9/1980 | Germany | 60/39.44 |

*Primary Examiner*—Marguerite McMahon

*Attorney, Agent, or Firm*—McAulay Fisher Nissen Goldberg & Kiel, LLP

[57] ABSTRACT

The two-cycle engine is constructed with a flywheel having pockets spaced about the periphery. The flywheel receives charges of combusted media at spaced apart points so as to rotate the flywheel. Each piston/cylinder arrangement for delivering power to the flywheel cooperates with a spring-biased counter-piston whereby after ignition, the counter-piston moves away from an associated piston to permit exhausting of the combusted mixture into a pocket of the rotating flywheel. The spring stores the energy caused by combustion and delivers the energy into the flywheel during exhaustion of the combusted mixture.

20 Claims, 5 Drawing Sheets

TWO-CYCLE ENGINE EMPLOYING A FLYWHEEL

This is a continuation of application Ser. No. 08/331,044 filed on Oct. 28, 1994.

This invention relates to a two-cycle engine employing a flywheel.

As is known, various types of engines have been constructed in order to deliver power from a combustible mixture, for example of fuel and air. For example, in automotive engines, it has been known to use a four-cycle engine in which a crankshaft moves a piston within a cylinder through intake, compression, power and exhaust cycles so that power is delivered for each two revolutions of the crankshaft. It has also been known to provide a two-cycle engine also employing a crankshaft, piston and cylinder arrangement wherein the piston is moved through intake, compression, power and exhaust cycles for each revolution of the crank shaft. Thus, a two-cycle engine is one which fires once every revolution of the crankshaft to deliver twice as many power strokes as an engine which fires every other revolution as in the case of a four-cycle engine.

In both types of engines, power is delivered to the crankshaft upon combustion of the combustible mixtures in the engine cylinders so that the crankshaft may, in turn, drive a transmission. In a conventional engine, the force generated by the explosion of an air/fuel mixture is transferred through a descending piston onto a cam lobe of the crankshaft. Typically, the point of application of the force is three inches from the center of the crankshaft. Thus, the force applied to the crankshaft is limited. In order to increase the torque, the point of application of the transmitted force may be applied at a greater distance from the center of the crankshaft; however, such would result in an enlargement of the overall engine compartment while also adding to an increased weight in the crankshaft.

Other types of engines have also been known which are of the internal combustion turbine rotor types such as described in U.S. Pat. No. 1,116,730. In this regard, the engine employs a plurality of circumferentially disposed cylinders each of which causes movement of a piston against the bias of a spring to open a port leading into a passageway from which combustion gases may pass onto the blades of a rotatable turbine wheel, In an engine of this character having a series of compression cylinders in communication with an annular chamber in which a series of impulse blades are mounted on a periphery of a turbine or flywheel, the explosions from the cylinders on the impulse blades act similar to a continuous blast. Also, as the force of the explosions are discharged onto a rotating element there should be no pounding by reason of a succession of explosions. A shaft in which the turbine wheel is mounted also includes a hub gear by means of which power can be taken off from the motor.

Similar turbine motors are also described in U.S. Pat. Nos. 976,006; 1,388,371; 2,336,786; 2,829,493; 3,175,360; 3,757,515 and 4,288,981.

U.S. Pat. No. 3,757,515 describes a two-stroke engine using pistons each of which is disposed in a respective combustion chamber. In addition, the engine employs valves which open to inject a fuel-air mixture into an end of each combustion chamber as well as a spark plug for igniting the mixture. During an exhaust stroke of a piston, air is compressed within a combustion chamber and, after ignition, is exhausted onto bucket vanes of a turbine wheel.

U.S. Pat. No. 2,829,493 describes a gas turbine having a wheel provided with peripheral blades arranged for receiving combustion gases from a plurality of combustion chambers that do not use reciprocating pistons to compress a fuel-air mixture.

All of the above described engines have been relatively complex and appear to be relatively inefficient particularly due to the use of a turbine with blades of an open construction. That is, when an exhaust gas is directed onto the impeller blades, at least some of the energy of the exhaust flow is dissipated past the blades without having an effect on the rotation of the blades.

Accordingly, it is an object of the invention to provide an improved two-cycle engine.

It is another object of the invention to improve the efficiency of a two-cycle engine employing a rotatable flywheel.

It is another object of the invention to provide a relatively simple two-stroke engine having an increased efficiency.

It is another object of the invention to provide a two-cycle engine which is able to provide a large torque.

Briefly, the invention is directed to a two-cycle engine which employs a rotatably mounted flywheel having a plurality of circumferentially spaced transfer pockets. In this respect, each transfer pocket is of closed nature. That is, each pocket is able to receive a flow of a combusted mixture without having the mixture flow through the remainder of the flywheel.

The engine further includes a housing means having at least one radially disposed cylinder therein for receiving a combustible mixture, a chamber opposite the cylinder and a power transmission cavity communicating with the chamber and facing the flywheel. The engine also has a piston slidably mounted in the cylinder as well as a transmission means for reciprocating the piston in the cylinder in order to compress a combustible mixture therein. Further, an ignition means is provided for igniting a compressed combustible mixture in the cylinder.

In accordance with the invention, the engine employs a counter-piston which is slidably disposed in the chamber of the housing means opposite the cylinder in order to move from an extended position to a retracted position spaced from the piston in the cylinder under the force of an ignited combustible mixture in the cylinder. A spring is also provided to bias the counter-piston from the retracted position to the extended position in order to exhaust a flow of the combusted mixture from the chamber through the power transmission cavity and into a pocket of the flywheel in order to effect rotation of the flywheel.

During operation, as the flywheel is rotating, the transmission means for reciprocating the piston cycles the piston so as to compress a combustible mixture in the cylinder. Upon ignition, the piston continues to move in the direction of the counter-piston in order to exhaust all of the combusted mixture from the cylinder. At the same time, the counter-piston moves away from the piston against the force of the spring while the combusted mixture moves into the chamber of the counter-piston. The timing of the rotation of the flywheel relative to this condition of the engine is such that the pocket of the flywheel moves into communication with the power transfer cavity communicating with the chamber of the counter-piston so that the combusted mixture flows through the power transfer cavity into the pocket of the flywheel. Thus, the force of the combusted mixture drives the flywheel in the direction of rotation.

The relative sizes of the cylinder, chamber and flywheel pocket are such that a substantial portion of the combusted mixture is delivered into the pocket of the flywheel so that the energy of the combusted mixture is substantially delivered to the flywheel.

As the pocket of the flywheel passes out of communication with the power transfer cavity, a residual amount of combusted mixture may remain within the chamber of the counter-piston as well as in the power transfer cavity. To this end, the counter-piston is provided with a recess coincident with and opposite the power transmission cavity to receive this residual amount of combusted mixture when the piston is in the fully extended position in the cylinder.

By way of example, assuming the combustion pressure developed in the cylinder of the piston is approximately 1000 psi, the pressure or power is sufficient to push the calibrated counter-piston away from the power transfer cavity against the force of the spring so that the power can be transferred to the pocket in the flywheel. This pressure will drop as the flywheel continues to move. At the same time, the counter-piston will be returned under the bias of the spring towards the piston so that the pressure on the mixture within the chamber will drop, for example below 600 to 500 psi. When the next pocket of the flywheel comes into communication with the power transfer cavity, another combustion takes place so that the counter-piston is again moved away from the piston.

Suitable means are provided to introduce air and fuel into the cylinder of the engine. For example, the counter-piston may be provided with a bore which extends coaxially therethrough while a valve body is mounted in the bore in order to move between a retracted position closing the bore and an extended position opening the bore to the cylinder. A spring is also provided to bias the valve body into the retracted position. In this embodiment, a means is provided for delivering air into the bore of the counter-piston for drawing into the cylinder in response to movement of the piston radially inwardly from the counter-piston during an intake stroke thereof and simultaneous movement of the valve body into the extended position thereof. A means is also provided for delivering fuel into the cylinder during a compression stroke of the piston.

The flywheel is constructed so as to have a circumferentially spaced series of pockets therein for sequentially receiving charges of a combusted mixture from each cylinder. For example, the pockets may be circumferentially spaced at an angle of 120° so that for each revolution of the flywheel, three power transfers are made to the pockets of the flywheel from each cylinder, The engine is also provided with a stationary manifold which communicates with the pockets of the flywheel in order to exhaust a flow of a combusted mixture from the pockets, In this respect, the manifold is angularly spaced from the counter-piston relative to the flywheel. Thus, each pocket can be scavenged of the combusted mixture before being exposed to a further charge of combusted mixture.

Typically, the engine is constructed with a plurality of cylinders in pistons with a common transmission means for reciprocating each piston within a respective cylinder sequentially through an intake position, compression position and ignition position. That is, the transmission means is constructed so as to move a piston through an intake stroke for the intake of air and through a compression stroke during which fuel may be injected into the cylinder for subsequent combustion by an ignition means at the completion of the compression stroke. Likewise, the engine is provided with a complementary number of chambers and counter-pistons to receive the combusted charges.

By way of example, the engine may be provided with four cylinders which are angularly spaced 90° apart while the flywheel is provided with pockets which are angularly spaced 10° apart. In this way, each of the four pistons will complete three combustions per flywheel revolution. As a result, twelve combustions per revolution of the flywheel will take place. Further, where the flywheel rotates at ten to thirty rpm, there would one hundred twenty to three hundred sixty ignitions per minute.

The construction of the engine is such that an impulse is directed onto the flywheel for each 30° of rotation in the given example. Because the pockets are of a closed nature, the entire energy of each combustion can be imparted to the flywheel without dissipating into the surrounding environment.

Since the flywheel may be made of any suitable diameter, the torque imparted to the flywheel can be made relatively large or relatively small, simply by changing the diameter of the flywheel.

One of the advantages of the invention is the use of the spring-biased counter-pistons. In this respect, the spring serves to store energy on ignition, for example, prior to a pocket of the flywheel coming into communication with a chamber of the counter-piston. Once communication takes place, the spring expands so as to dissipate the energy into the combusted mixture for transfer into the flywheel pocket.

These and other objects and advantages of the invention will become more apparent from the following detailed description wherein.

Figure 1:
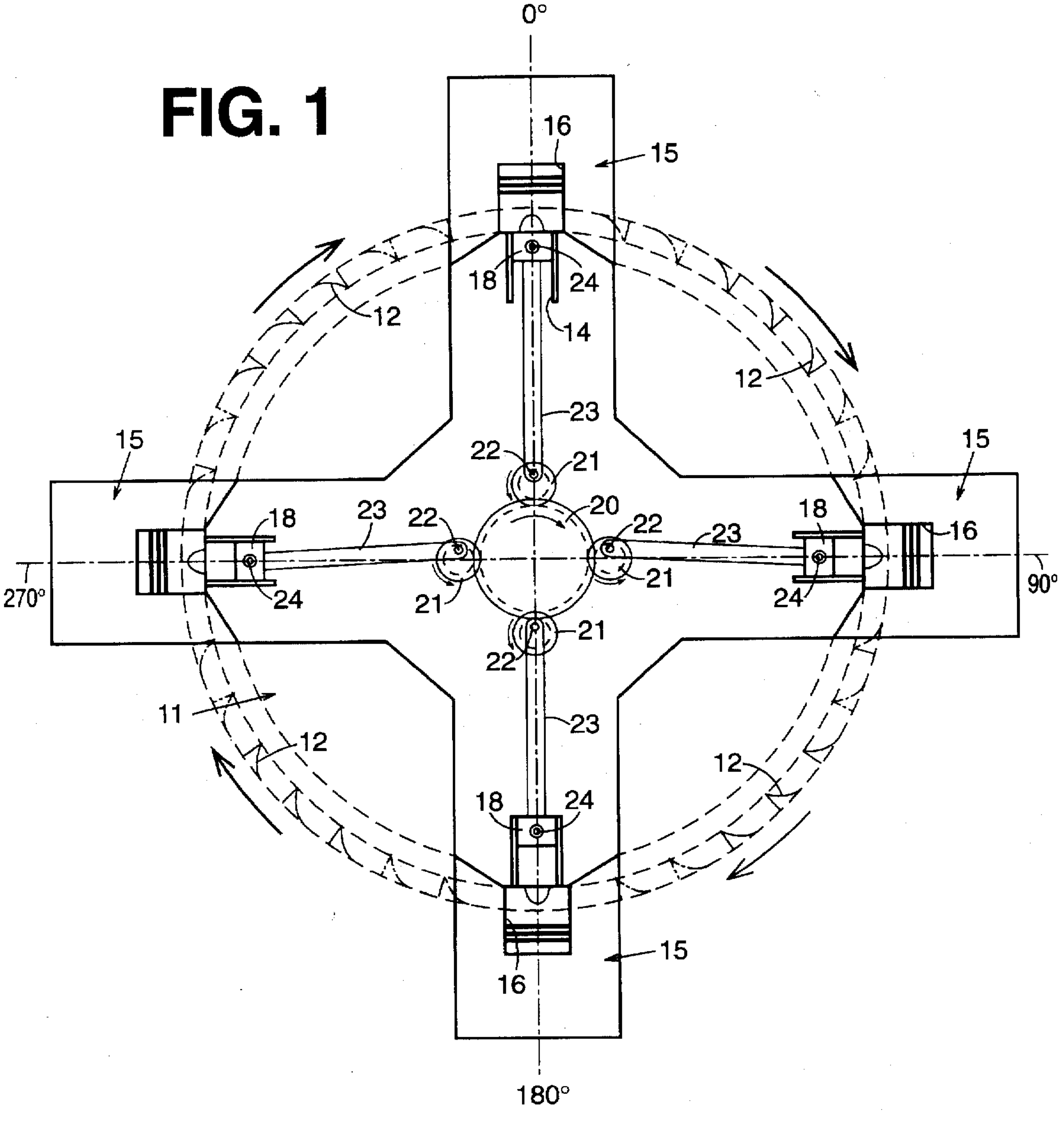
FIG. 1 illustrates a schematic view of a two stroke engine constructed in accordance with the invention.

Referring to FIG. 1, the two-cycle engine 10 may be constructed for incorporation in various types of motors or engines. However, for simplicity, a very simplified embodiment of the two-cycle engine 10 will be described hereinafter and illustrated in the drawings.

Figure 7:
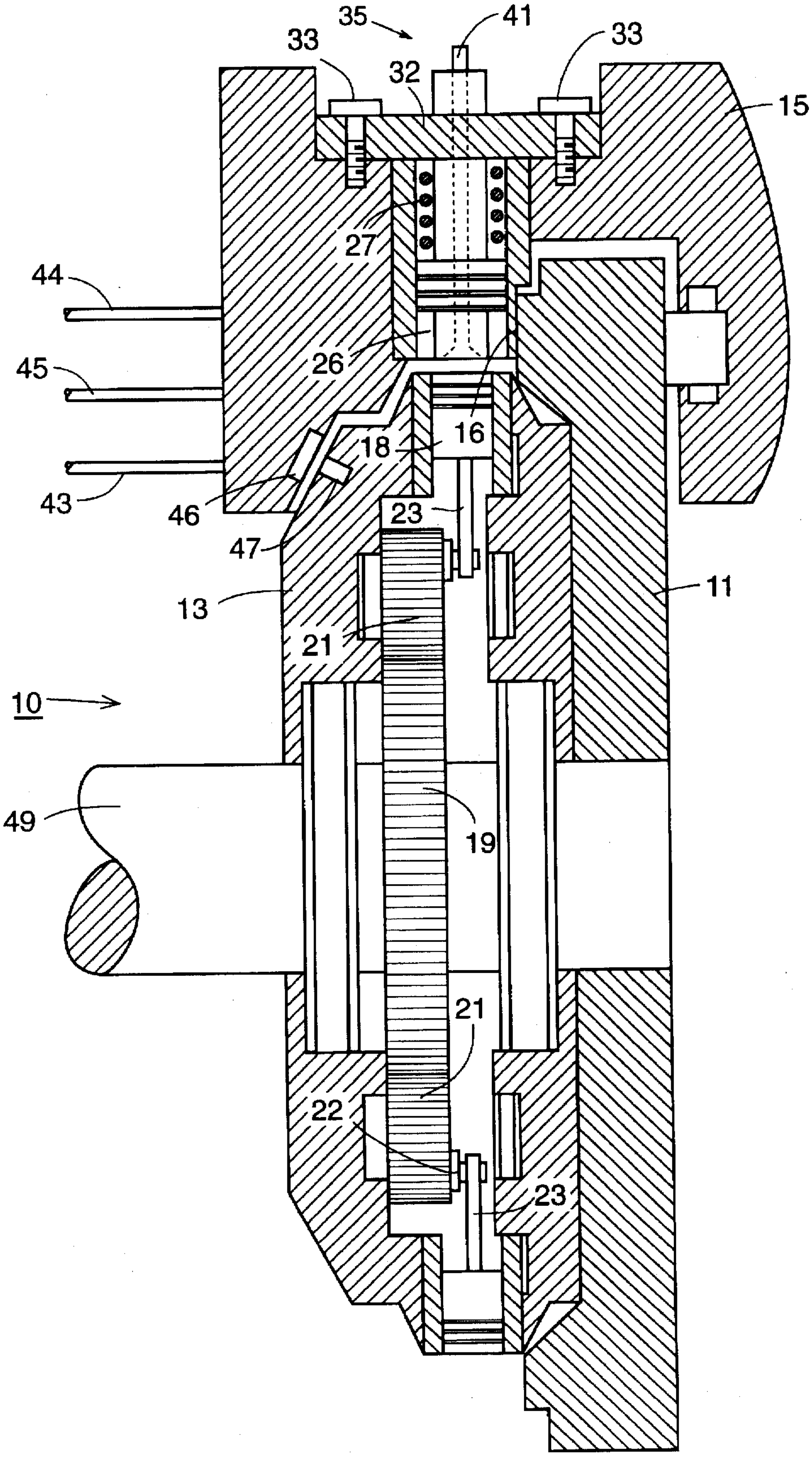
FIG. 7 illustrates a cross-sectional view of a fuel injection means for the engine.

As shown, the two-cycle engine includes a rotatably mounted flywheel 11 having a plurality of transfer pockets 12 disposed in equi-spaced relation about the periphery of the flywheel. In addition, the engine 10 includes a stationary housing means including a stationary main housing 13 which includes a plurality, for example four, radially disposed cylinders 14 for receiving a combustible mixture. In addition, the housing means includes a plurality of secondary housings 15 spaced about the main housing 13. Each secondary housing 15 includes a chamber 16 opposite a cylinder 14 and a power transmission cavity 17 (see FIG. 3) which communicates with the chamber 16 and which faces the flywheel 11. In this regard, the main housing 13 and the flywheel 11 are disposed in side-by-side relation and each secondary housing 15 straddles the main housing 13 and flywheel 11 (FIG. 7).

The engine 10 also includes a plurality of pistons 18, each of which is slidably mounted in a respective cylinder 14. A transmission means 19 is also connected with the pistons 18 for reciprocating each piston 18 in a respective cylinder 14 in order to compress a combustible mixture therein. As indicated in FIG. 1, the transmission means 19 includes a rotatable gear 20 which is rotatable about a common axis with the flywheel 11. In addition, a plurality of gears 21 are disposed in meshing relation with the main wheel 20 at equi-spaced points in order to be driven thereby about parallel axes of rotation, Each wheel 21 is, in turn, connected via a suitable pivot connection 22 to a piston rod 23 which, in turn, is pivotally connected by a pivot bearing 24 to a piston 18.

Upon rotation of the main gear 20, each auxiliary gear 21 is rotated so as to cause a reciprocating motion of the associated piston 18 in a cylinder 14. For example, where the main gear 20 is rotated in a clockwise manner, each auxiliary gearwheel 21 rotates in a counter-clockwise manner.

Further, the piston rods 23 are connected to the respective auxiliary gears 21 in a synchronized manner so that each connection 22 is located at a point 90° relative to the other. That is, during rotation of an auxiliary gear 21, the interconnected piston 18 is caused to move from an ignition stroke shown at position 0° in FIG. 1 through an intake position shown at 90° in FIG. 1; through a complete intake position shown at 180° in FIG. 1; and through a compression position shown at 270° in FIG. 1 back to the ignition position.

Figure 6:
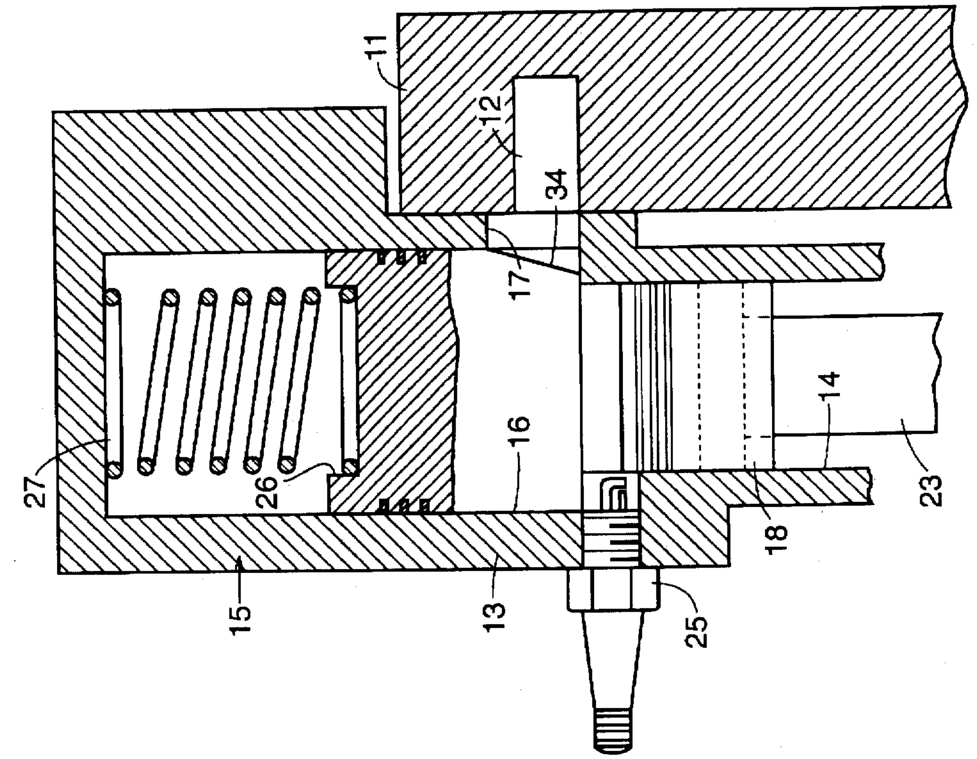
FIG. 6 illustrates a part cross-sectional view of the engine with an ignition means in accordance with the invention.

Referring to FIG. 6, an ignition means 25, such as a spark plug is mounted in the main housing 13 adjacent each cylinder 14 for igniting a compressed combustible mixture in the cylinder 14.

The main housing 13 thus serves as the housing for the gears of the transmission 19 and the pistons 18.

As shown in FIG. 7, each secondary housing 15 receives an outer periphery of the flywheel 11 in a relatively rotatable manner via a suitable bearing while also straddling the main gear and piston housing 13.

Figure 2:
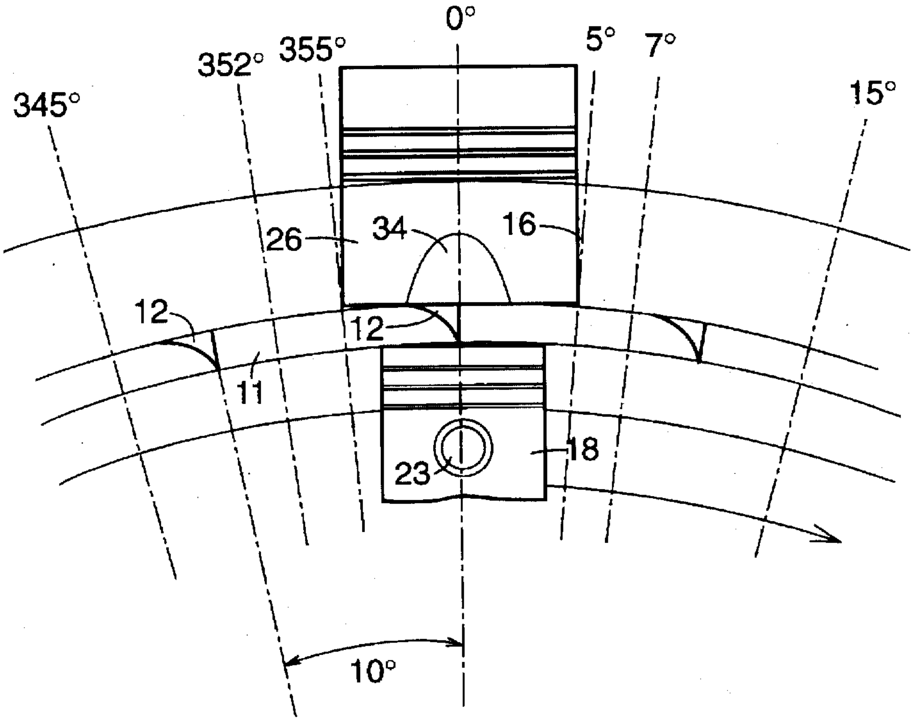
FIG. 2 illustrates a fragmentary view of the housing of the engine relative to a flywheel in accordance with the invention.
Figure 4:
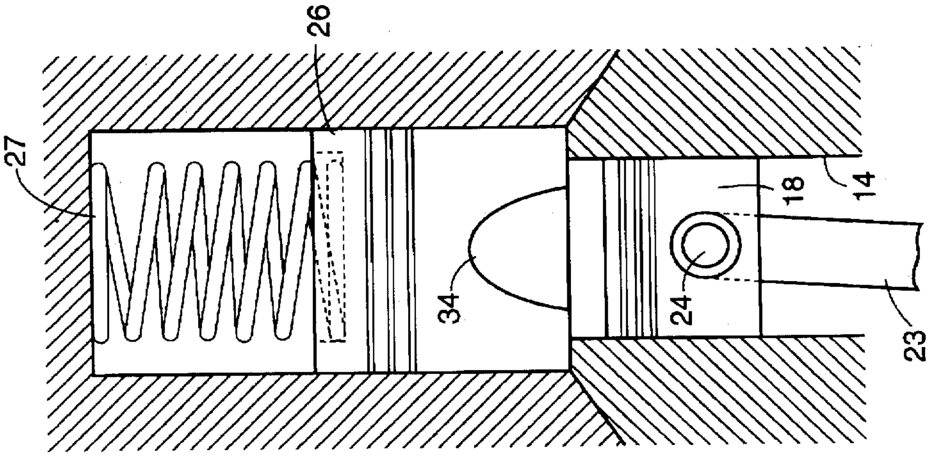
FIG. 4 illustrates a cross-sectional view of a cylinder and chamber arrangement in accordance with the invention.

As shown in FIG. 2, each secondary housing 15 has a counter-piston 26 slidably disposed in the chamber 16 thereof opposite a respective cylinder 14 in order to move from an extended position as shown in FIG. 4 to a retracted position as shown in FIG. 2 spaced from the piston 14 under the force of an ignited combustible mixture in the cylinder 14.

Figure 5:
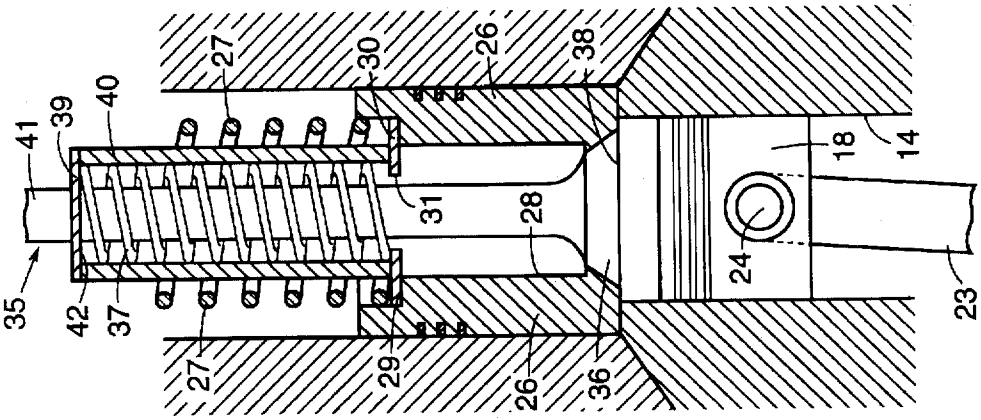
FIG. 5 illustrates a view similar to FIG. 4 of an air intake valve arrangement in accordance with the invention.

Referring to FIGS. 4, 5, and 7, a spring 27 is mounted within each secondary housing 15 so as to bias the respective counter-piston 26 in a direction toward the cylinder 14 and piston 18 therein. As shown in FIG. 5, the counter-piston 26 has a bore 28 extending coaxially therethrough and has a shoulder 29 at the upper end, as viewed. A washer or plate 30 having a central aperture 31 is positioned on the shoulder 29 to receive one end of the spring 27. The opposite end of the spring 27 is abutted against a plate 32 secured as by bolts 33 to and in a recess in the secondary housing 15.

Referring to FIG. 6, when a combustible mixture in a chamber 16 has been compressed and then ignited via the spark plug 25, the subsequent explosion creates an expansive force within the space in the cylinder 14 and the space in the opposed chamber 16. Since the piston 18 is being moved upwardly, as viewed, under the positive force of the piston rod 23, the combusted mixture moves upwardly into the chamber 16 thereby forcing the counter-piston 26 against the bias of the spring 27 into a retracted position, for example as indicated in FIG. 2. At this time, the combusted mixture flows through the adjacent power transfer cavity 17 to then flow into a transfer pocket 12 in the flywheel 11. The power delivered by the combusted mixture thus serves to effect rotation of the flywheel 11, for example in a clockwise direction as viewed in FIGS. 1 and 2.

Since the pocket 12 is closed, the combusted mixture is able to completely fill the pocket 12 without dissipation of energy into the surrounding environment.

Figure 3:
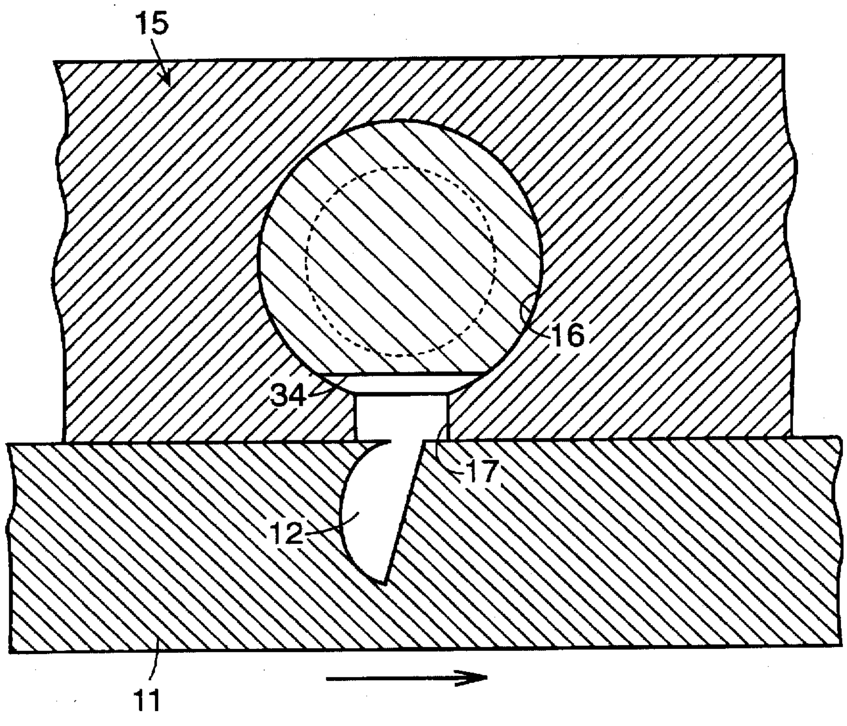
FIG. 3 illustrates a plan view of a segment of the housing relative to a segment of the flywheel in accordance with the invention.

As shown in FIGS. 2, 3 and 6, each counter-piston 26 is provided with a recess 34 which is coincident with and opposite the power transmission cavity 17 in order to receive a residual amount of combusted mixture from the cylinder 14 with the piston 18 in the fully extended position within the cylinder 14.

Referring to FIGS. 5 and 7, an air delivery means 35 is also provided to deliver air for combustion purposes into each secondary housing 15 and specifically into the bore 28 of a counter-piston 26. In this respect, the means includes an intake valve body 36 which is reciprocally mounted within the bore 28 of a counter-piston 26. As shown, the valve body 36 is biased by a spring 37 into a retracted position sealing against a valve seat 38 of the counter piston 26. As indicated, the spring 37 is mounted between the plate 30 which is disposed on the shoulder 29 of the counter-piston 26 and a plate 39 which is secured to the valve body 36 via a sleeve 40. The spring 37 serves to bias the valve body 36 in an upward direction as viewed. Accordingly, a suitable opening is provided within the plate 39 to permit passage of the stem 41 of the valve body 36.

Referring to FIG. 5, during operation, when a piston 18 is retracted within a cylinder 14, the piston 18 creates a vacuum force in the cylinder 14 exposed to the valve body 36. The valve body 36 is thus drawn into the cylinder 14 so that air is delivered via the bore 28 of the counter-piston 26 into the cylinder 14. In this respect, the plate 39 which guides the stem 41 of the intake valve body 36 may also provide for passage of a compressed air line (not shown) to deliver compressed air via the sleeve 40 into the bore 28 or the plate 39 may have one or more apertures 42 to allow ambient air to be drawn into the sleeve 40.

After the piston 18 has been completely retracted within the cylinder 14, the intake valve body 36 is biased by the spring 37 into the closed position fully seated on the valve seat 38 so as to prevent any further flow of air from the bore 28 of the counter-piston 26 into the cylinder 14.

Figure 8:
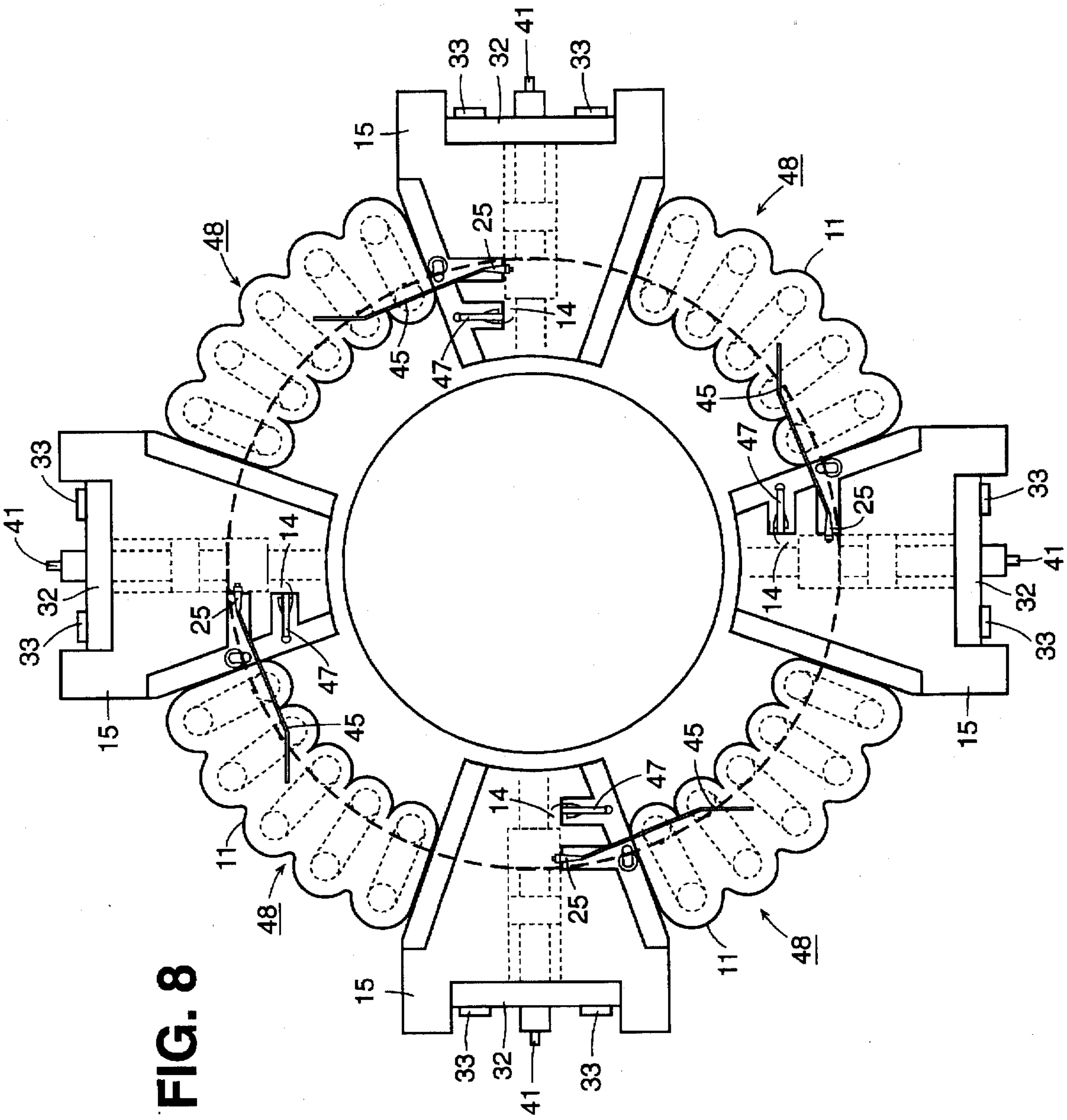
FIG. 8 illustrates a front view of the engine and an exhaust manifold connected therewith.

Referring to FIGS. 7 and 8, a fuel intake means is also provided for directing fuel into each cylinder 14 prior to a piston 18 reaching the compression position. As indicated, the fuel intake means includes a primary fuel injector line 43 and a secondary fuel injector line 44. The primary fuel injector line 43 communicates via a duct 46 in the secondary housing 15 to communicate with a corresponding duct 47 in the main housing 13 in order to convey the fuel therebetween. The duct 47 in the main housing 13, in turn, communicates with the cylinder 14 so as to deliver fuel into the cylinder 14. Metering of the fuel injection can be accomplished in the conventional fashion and need not be further described.

The secondary fuel injection line 44 communicates via a suitable duct in the secondary housing 15 with a trailing second pocket 12 in the flywheel 11 (see FIG. 2) so as to fill the second pocket with fuel prior to this pocket 12 coming into the communication with the outlet opening 17 of the transfer chamber 16. Thus, when this second trailing pocket 12 comes into communication with the outlet opening 17 as indicated in FIG. 3, the fuel in the pocket 12 is combusted by the hot combustion mixture expelled from the transfer chamber 16 via the outlet opening 17. Thus, an increased combustion will take place adding to the force needed to drive the flywheel 11 further. This injected fuel is thus utilized to accelerate the flywheel 11. Metering of this fuel injection can also be accomplished in a conventional fashion and need not be further described.

As also indicated in FIG. 7, an ignition line 45 is provided in each secondary housing 15 to communicate with the ignition means 25 in each cylinder 14. Again, such a construction is of conventional nature and need not be further described.

Referring to FIGS. 2 and 3, each pocket 12 in the flywheel 11 has a semi-circular profile (see FIG. 3) in a plane radially of the flywheel 11 and is of decreasing radial height in a direction opposite the direction of rotation of the flywheel. These pockets 12 are circumferentially spaced a distance sufficient for one pocket 12 to pass a respective outlet opening 17 before a second trailing pocket 12 communicates with the outlet opening 17. For example, the pockets may be spaced 10° apart.

Referring to FIG. 8, a stationary exhaust manifold 48 is disposed at each of four places about the flywheel 11 to communicate with the pockets 12 therein in order to receive an exhaust flow of the combusted mixture. As shown, the manifolds 48 are angularly spaced from the counter-piston 26 relative to the flywheel 11 and each has one or more exhaust ports as needed to exhaust the spent combustion gases from the engine 10.

The engine 10 is of relatively simple construction and operation. For example, after starting up the engine to a suitable starting mechanism, a main drive shaft 49 of the engine 10 on which the flywheel 11 is mounted, drives the main gearwheel 20 of the transmission means 19.

Because of the operation of the transmission means 19, each of the four illustrated pistons 18 carries out a reciprocating cycle while the flywheel 11 continues to rotate. If fuel is directed to one or more of the cylinders the following effects occur.

Initially, for the piston 18 shown in the 0° position of FIG. 1, rotation of the main gear wheel 20 and the auxiliary gear 21 serves to withdraw the piston 18 downwardly, as viewed. This, in turn, causes the intake valve body 36 (see FIGS. 5 and 7) in the counter-piston 26 within the facing chamber 16 to be drawn away from the valve seat 38 into the cylinder 14. As a result, air is drawn into the cylinder 14. This intake phase continues until the auxiliary gear 21 achieves a 180° position. At this time, the piston 18 begins to move upwardly within the cylinder 14 and the spring 37 returns the valve body 36 to a closed position on the valve seat 38. Fuel is then injected through the fuel injection means 43, 44.

During the continued upward stroke of the piston 18, the air and fuel mixture is compressed during a compression phase. As the cylinder 14 approaches a top dead center position, for example as shown in FIG. 6, the spark plug 25 causes ignition of the combustible mixture. The subsequent explosion causes the counter-piston 26 disposed in facing relation to move against the bias of the spring 27 (see FIG. 4) so that the chamber 16 becomes filled with the combusted mixture. At the same time, the mixture exhausts through the power transfer cavity 17 into a pocket 12 of the flywheel 11 which is passing thereby.

In the event that a pocket 12 of the flywheel 11 is not in communication with the power transfer cavity 17, the combusted mixture would remain within the chamber 15 of the counter-piston 25.

As a pocket 12 passes by the power transfer cavity 17, the combusted mixture is directed into the pocket 12 under the biasing force of the spring 27. During this time, the counter-piston 26 moves from a retracted position as shown in FIG. 3 towards the extended position shown in FIG. 6. As a result, the exhausted combustible mixture forces the flywheel 11 to continue to rotate, for example clockwise, in the direction indicated in FIG. 2.

The spring 27 thus serves to store energy on ignition and uses this energy as the spring 27 extends towards the extended position of the counter-piston 25.

As the flywheel 11 continues to rotate, the pocket 12 which has been filled with the exhausted combusted mixture passes through the manifold 48 so that the combusted mixture is scavenged from the pocket 12 so that the pocket 12 may receive another charge from the next piston and counter-piston arrangement.

In the embodiment of FIG. 1, the transmission means 19 may be constructed so that for each full revolution of the gearwheel 20, and for each revolution of the flywheel 11, there may be 12 ignitions. That is, each piston/cylinder arrangement may have three ignitions which are spaced at intervals of rotation of 120° of the flywheel 11. Thus, ignition takes place at each 30° of rotation of the flywheel at a different piston/cylinder.

The pockets 12 of the flywheel 11 may be spaced apart, for example at intervals of 10°.

In the event that there is no negative pressure in a cylinder 14 during an intake stroke of the piston 18, the intake valve body 36 within the counter-piston 26 does not open. As a result, air is not drawn into the cylinder 14. Likewise, if there is no compressed air within the cylinder 14 during a compression stroke, the fuel injection means may be deactivated, for example electronically, so as to avoid delivering fuel into the cylinder 14.

In the case of a misfire of a cylinder 14, the pressure in the cylinder 14 would reduce gradually on the downstroke of the piston 18 of that misfired cylinder 14. Because of this, the fuel injection position may be located so that the pressure in the cylinder 14 is greater than the pressure on the fuel so that no additional fuel will enter the cylinder 14.

Further, the pressure in the misfired cylinder 14 prevents the intake valve body 36 from opening. In addition, the stem 41 of the intake valve body 36 may have a monitor (not shown) to prevent fuel injection thus preventing any excess fuel from entering the cylinder 14 for the chamber 16 of the counter-piston 26.

The engine 10 is constructed so that the force delivered to the flywheel 11 via the pockets 12 is at a point at a relatively large distance from the center of the flywheel 11, i.e. the center of the gearwheel 20. Thus, a relatively large torque can be obtained as opposed to a conventional crank shaft arrangement wherein the point of application of the force is approximately three inches from the center of the crank shaft. By way of example, the diameter of the flywheel may be twelve inches so that the point of application of the force is approximately six inches from the center of the flywheel. Larger diameter flywheels are also possible.

In addition, a plurality of flywheels 11 may be mounted on a common axis and driven by a suitable array of piston/cylinder arrangements so that additional power can be delivered to a take-off shaft.

The flywheel 11 is connected via a suitable hub to the main shaft 49 so that the power of the flywheel 11 can be transferred to the main shaft 49.

The manifolds 48 which are mounted about the housing 13 may communicate with a turbine separate from the flywheel 11 so as to deliver the exhausted mixtures thereto for delivery of residual power to the turbine.

Since the flywheel 11 has closed pockets which receive the power from the exhausted combusted mixture, most of the energy of the mixture is delivered to the flywheel 11 without being dissipated to the surrounding environment as would be the case with a turbine having impeller vanes.

In order to prevent a backfire, the very first ignition which is effected by a starter (not shown) is initiated after a piston 18 in a cylinder 14 has passed the crest of the compression point in its cycle. In this respect, ignition of the combustible mixture within the cylinder 14 is retarded. Once the flywheel 11 is in motion, the momentum of the flywheel 11 is sufficient so that subsequent ignitions are normalized.

The two-cycle engine may also be adapted as a diesel engine type by changing the gear ratio, for example, from 3 to 1 to 2 to 1 while increasing compression. In addition, the ignition plug may be eliminated and the location of the fuel injection can be relocated to a suitable position.

The invention thus provides a relatively simple and efficient two-cycle engine employing a rotatable flywheel. Further, the invention provides a two-cycle engine which is able to provide a large torque.

What is claimed is:

1. In a two-cycle engine, the combination comprising a rotatably mounted flywheel having at least one transfer pocket therein;

a stationary housing means having at least one radially disposed cylinder therein for receiving a combustible mixture, a chamber opposite said cylinder and a power transmission cavity communicating with said chamber and facing said flywheel;

a piston slidably mounted in said cylinder;

transmission means for reciprocating said piston in said cylinder to compress a combustible mixture therein;

ignition means for igniting a compressed combustible mixture in said cylinder;

a counter-piston slidably disposed in said chamber of said housing means opposite said cylinder and piston to move from an extended position adjacent said cylinder to a retracted position spaced from said piston and said cylinder under the force of an ignited combustible mixture in said cylinder; and a spring biasing said counter piston from said retracted position to said extended position to exhaust a flow of the combusted mixture from said chamber through said power transmission cavity into said pocket of said flywheel to effect rotation of said flywheel.

2. The combination as set forth in claim 1 wherein said counter-piston has a recess therein coincident with and opposite said power transmission cavity to receive a residual amount of combusted mixture from said cylinder with said piston in a fully extended position in said cylinder.

3. The combination as set forth in claim 1 wherein said counter-piston has a bore extending coaxially therethrough and which further comprises a valve body mounted in said bore to move between a retracted position closing said bore and an extended position opening said bore to said cylinder and a spring biasing said valve body into said retracted position thereof.

4. The combination as set forth in claim 3 which further comprises means for delivering air into said bore of said counter-piston for drawing into said cylinder in response to movement of said piston radially inwardly from said counter-piston during an intake stroke thereof and simultaneous movement of said valve body into said extended position thereof and means for delivering fuel into said cylinder during a compression stroke of said piston.

5. The combination as set forth in claim 1 wherein said flywheel has a circumferentially spaced series of said pockets therein for sequentially receiving a flow of a combusted mixture therein.

6. The combination as set forth in claim 5 wherein said pockets are circumferentially spaced at an angle of 10° therebetween.

7. The combination as set forth in claim 1 which further comprises a stationary manifold communicating with said pocket during rotation of said flywheel to exhaust a flow of a combusted mixture therefrom, said manifold being angularly spaced from said counter-piston relative to said flywheel.

8. The combination as set forth in claim 1 which further comprises a primary fuel injection line communicating with said cylinder for delivering fuel into said cylinder and a secondary fuel injection line communicating with said pocket in said flywheel for delivering fuel to said pocket for combustion with the combusted mixture exhausted from said chamber.

9. A two-cycle engine comprising a stationary main housing having a plurality of peripherally disposed cylinders disposed radially of a common central axis and a plurality of chambers, each chamber being disposed opposite a respective cylinder;

a plurality of pistons, each piston being slidably disposed in a respective cylinder;

transmission means for reciprocating each piston within a respective cylinder sequentially from an intake position, through a compression position, to an ignition position;

a plurality of secondary housings spaced about said main housing, each secondary housing having a chamber therein in facing relation to a respective cylinder of said main housing;

a plurality of counter-pistons, each counter-piston being slidably disposed in a respective chamber in a respective secondary housing opposite said piston in a respective cylinder;

a plurality of springs, each spring being disposed between a respective counter-piston and said secondary housing to bias said respective counter-piston towards a respective cylinder;

a power transfer cavity in each said secondary housing disposed in communication with a respective chamber to receive an exhaust flow therefrom;

a flywheel rotatably mounted on said axis of said main housing, said flywheel having a plurality of transfer pockets disposed therein for sequentially receiving an exhaust flow from a series of said power transfer cavities;

intake means for directing a combustible mixture into each respective cylinder prior to a respective piston in said cylinder reaching said compression position; and means for igniting a combustible mixture in each respective cylinder at said ignition position of a piston therein to effect a flow of combusted mixture into a respective oppositely disposed chamber.

10. An engine as set forth in claim 9 wherein said main housing and said flywheel are disposed in side-by-side relation.

11. An engine as set forth in claim 10 wherein each pocket in said flywheel has a semi-circular profile in a plane radially of said flywheel and is of decreasing radial height in a direction opposite the direction of rotation of said flywheel.

12. An engine as set forth in claim 10 wherein said pockets are circumferentially spaced a distance sufficient for one of said pockets to pass a respective outlet opening before a second trailing pocket communicates with said outlet opening.

13. An engine as set forth in claim 9 wherein each counter-piston has a bore extending therethrough coaxially of an oppositely disposed piston and wherein said intake means includes an intake valve body mounted in said bore of said counter-piston in facing relation to said oppositely disposed piston and a spring disposed between said intake valve and said counter-piston for biasing said valve body into a closed position on said counter-piston.

14. An engine as set forth in claim 13 wherein each said spring between a respective valve body and a respective counter-piston is disposed concentrically within a second spring biasing said respective counter-piston towards a respective cylinder.

15. An engine as set forth in claim 9 wherein each counter-piston has a recess therein coincident with a respective power transfer cavity for receiving an exhaust flow.

16. An engine as set forth in claim 9 which further comprises a plurality of manifolds disposed about said flywheel, each manifold being disposed for communication with said pockets of said flywheel during rotation thereof to exhaust combusted mixture therefrom.

17. An engine as set forth in claim 9 wherein said cylinders are angularly spaced 90° apart and said pockets are angularly spaced 10° apart.

18. An engine as set forth in claim 9 which further comprises means connected to said flywheel to be driven thereby.

19. An engine as set forth in claim 18 wherein said means connected to said flywheel is a main drive shaft.

20. An engine as set forth in claim 9 which further comprises a primary fuel injection line connected to each secondary housing for communicating with a respective one of said cylinders for delivering fuel thereto and a secondary fuel injection line connected to each secondary housing for sequentially communicating with said pockets of said flywheel to deliver fuel thereto.

* * * * *